H. PETTIBONE & C. L. STRAUB.
METHOD OF OPERATING GAS POWER PLANTS.
APPLICATION FILED FEB. 20, 1909.

1,004,588.

Patented Oct. 3, 1911.
6 SHEETS—SHEET 1.

Fig. 1.

Witnesses
C. N. Walker.
M. Brashears

Inventors
Hawley Pettibone
C. Lee Straub
By E. B. Clark
Attorney

H. PETTIBONE & C. L. STRAUB.
METHOD OF OPERATING GAS POWER PLANTS.
APPLICATION FILED FEB. 20, 1909.

1,004,588.

Patented Oct. 3, 1911.

UNITED STATES PATENT OFFICE.

HAWLEY PETTIBONE, OF NEW ROCHELLE, NEW YORK, AND CONSTANTINE LEE STRAUB, OF PERTH AMBOY, NEW JERSEY, ASSIGNORS TO MARINE PRODUCER GAS POWER COMPANY, A CORPORATION OF NEW YORK.

METHOD OF OPERATING GAS-POWER PLANTS.

1,004,588.      Specification of Letters Patent.      Patented Oct. 3, 1911.

Original application filed July 25, 1908, Serial No. 445,344. Divided and this application filed February 20, 1909. Serial No. 479,113.

*To all whom it may concern:*

Be it known that we, HAWLEY PETTIBONE, residing at New Rochelle, in the county of Westchester and State of New York, and CONSTANTINE LEE STRAUB, residing at Perth Amboy, in the county of Middlesex and State of New Jersey, citizens of the United States, have invented certain new and useful Improvements in Methods of Operating Gas-Power Plants, of which the following is a specification.

This invention relates to the method of operating a gas-power plant, for propelling marine vessels, and for other purposes.

At the present time there is an increasing demand for a better and more economical motive power for propelling vessels and other purposes, than can be supplied by steam, or the lighter hydrocarbon liquids used in internal combustion engines. Coal as used for generating steam power is extremely bulky, taking up much room which might be used to much better advantage for storage of freight or for increased passenger accommodations; and hydrocarbon liquids are too expensive to be used on a commercial scale as a motive power in internal combustion engines. By converting coal, especially the cheaper and universally distributed bituminous coal, into gas, generated as required and used as generated, as the motive power in internal combustion engines the fuel bill is reduced about fifty per cent. and the room for storage is correspondingly increased, as compared with the weight and bulk of fuel now required for steam power.

The object of our invention is to provide for generating gas for operating an internal combustion engine, from bituminous coal or other fuel, continuously drawing it off by an exhauster, cleaning it, reducing to constant and approximately atmospheric pressure, and blowing off, or diverting and storing gas when the engine is reversed or temporarily stopped, whereby the generation of standard gas may be made continuous and the body of fuel in the producer be maintained in full operative condition and a standard quality of gas be delivered on instant demand to the engine.

This is a division of our application for patent Serial Number 445,344, filed July 25, 1908, containing claims for the apparatus.

The matter constituting our invention herein will be defined in the claims.

The details of construction and arrangement of a suitable apparatus for carrying out our method of operating a marine gas power plant are illustrated in the accompanying drawings, in which—

Fig. 2ª represents a sectional detail view of the base of the generator at the ash-pit, showing an inlet-pipe for compressed gas. Figs. 5 and 5ª represent a diagrammatic view in vertical section of most of the apparatus of a marine gas power plant.

In our gas power plant we preferably provide two generators or gas producers, 1 and 1ª, though each is an independent unit, for the purpose of generating and delivering gas. Each generator is separately connected at the base to a tubular economizer, as 2 and 2ª, of identical construction, and each of these is connected at the top to a single water-spray scrubber, 3. Both generators may be operated at the same time and deliver producer-gas to this gas scrubber, or either one may be operated separately and deliver to the scrubber, according to the volume of gas required.

Figure 1:
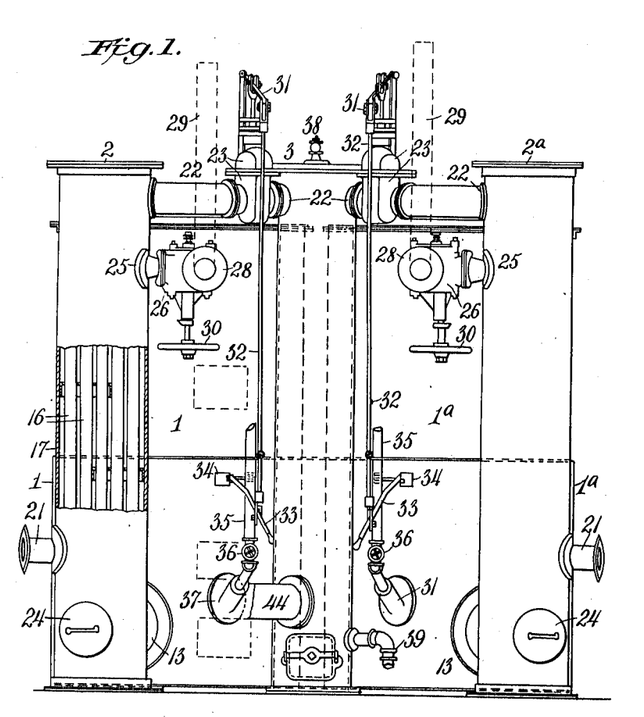
Figure 1 represents a rear elevation of part of the apparatus with parts in section.
Figure 2:
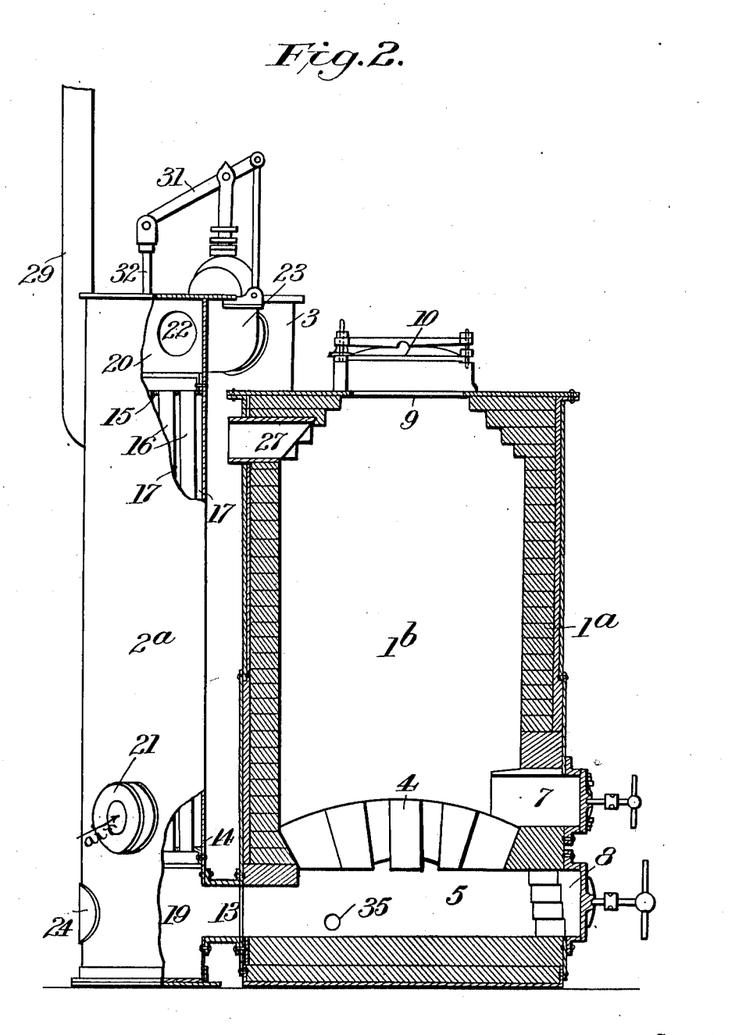
Fig. 2 represents a partial side elevation and partial vertical section of a generator and economizer.
Figure 2A:
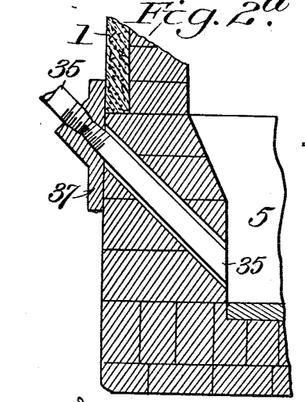

The producer or generator 1, is constructed with a plate iron shell having a fire-brick lining and is provided with a fire-brick grate 4, forming a fuel chamber 1ᵇ above and an ash pit 5 below. Openings and doors 7 and 8, having fastening devices are provided in the wall of the fuel chamber and ash pit for cleaning and regulating the fire, and removing ashes. A large central fuel supply opening 9, having a tight fitting cover 10, is provided in the top of the generator. At the base a brick lined flue 13 connects with the lower gas chamber 19 of the economizer 2. This economizer is constructed with lower and upper tube-sheets 14 and 15, connected by tubes 16, and forming the heating chamber 17 and the lower and upper gas chambers 19 and 20. The chamber 17 may have baffle plates, fitting around the tubes and extending transversely from the walls about half the diameter of the cylinder as shown in Fig. 1. These baffle-plates serve to deflect the air, or mixed air and spent gases from a gas engine, back and forth against the tubes for better absorbing the heat. At the base of chamber 17 connects an air-inlet pipe 21, with which connects a pipe 60, Figs. 4 and 5, admitting exhaust spent gases from the engine. A gas pipe 22, having a valve 23, connects with chamber 20 and leads to the top of scrubber 3. A hand-hole and cover 24 are provided in the wall of gas chamber 19. A delivery pipe 25, Figs. 1 and 3, connects with the upper part of chamber 17 and with a three-way valve 26 which connects by a short pipe 27 with the top of the generator and by a pipe 28 with the purge stack 29. Valve 26 is provided with a downwardly projecting stem and hand wheel 30.

To the stem of gate-valve 23 is pivoted a lever 31, which is pivoted to a standard and to an operating rod 32 which, at its lower end, is pivoted to a hand-lever 33, in turn pivoted to a fixed bracket 34, for raising and lowering the gate.

Figures 5, 5A:
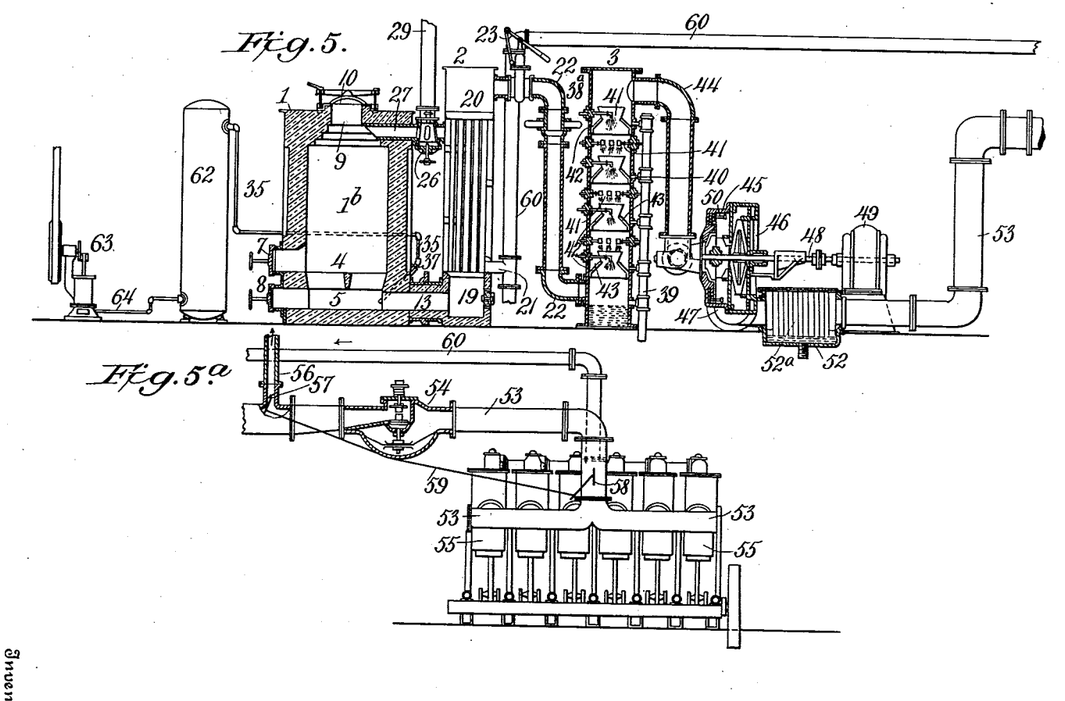
Figure 6:
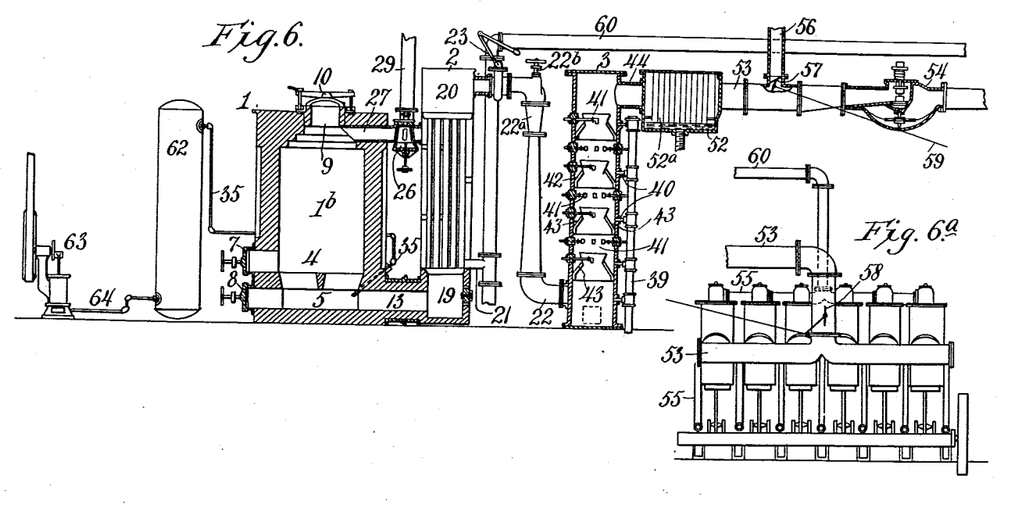
Figs. 6 and 6ª represent a sectional diagrammatic view of a modification of the apparatus.

A pipe 35, having a valve 36, connects with a tank 62, filled with compressed gas by compressor 63 and pipe 64, Figs. 5 and 6, and extends through a flanged socket 37, Figs. 1, 2ª and 5, into the ash pit, for discharging jets of gas, under pressure and impulse, into the body of ignited fuel, for blowing out ash and cinder. In a downdraft gas producer or generator the interstices of the fuel become plugged, after a few hours operation, with ash and cinder, so that it is difficult to draw air and gas down into and through the fuel, thus decreasing the make of gas. Under this condition the valve 36 is suddenly opened, permitting a jet of gas under pressure to be injected into the fuel, with the result that the ash and cinder are blown out of the purge-stack 29, the three-way valve being at that time adjusted to connect the top of the generator to the purge-stack. The operation being performed, the valve 36 will be closed and valve 26 adjusted to connect chamber 17 with the top of the generator.

Figure 4:
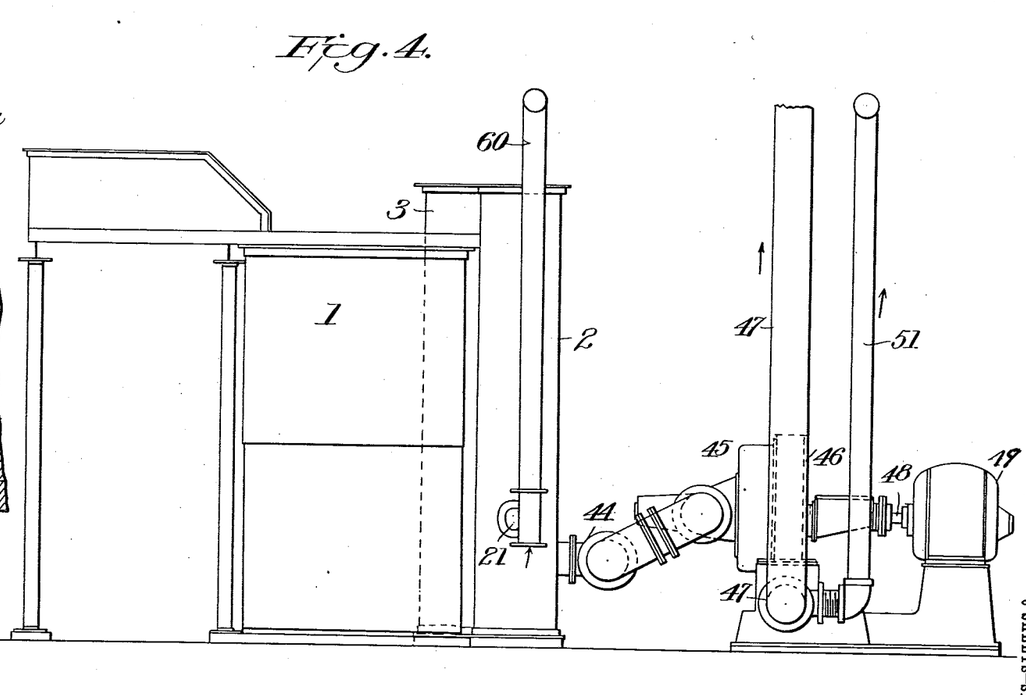
Fig. 4 represents a side elevation of the apparatus on reduced scale, showing a centrifugal extractor, a fan and motor.

The water-spray scrubber 3, Fig. 5, is provided with numerous jet nozzles 41 arranged in clusters for spraying water in contact with the current of gas and these nozzles are supplied with water by a main pipe 38 having numerous branches 38ª, as shown in the diagrammatic view, Fig. 5. The main water discharge pipe 39 connects by short branch pipes 40 with annular water chambers 43 provided by the conical diaphragms 42 arranged at suitable intervals in the scrubber cylinder 3, Fig. 5. A main gas outlet pipe 44 connects with the upper end of the scrubber 3, and leads to a centrifugal extractor 45 and exhaust fan 46. The extractor and fan are mounted in a suitable casing upon a shaft 48 which is coupled to the shaft of a high speed electric motor 49, fixed on a suitable foundation, as shown in Fig. 4, and in the diagrammatic view, Fig. 5. In Figs. 1 and 4 the gas outlet pipe 44 connects with the lower end of the scrubber 3 and leads to the centrifugal extractor 45. The centrifugal extractor is also provided with water spray-pipes 50. A gas outlet pipe 47 connects with the periphery of the fan casing 46 and may lead therefrom directly to the gas engine or to an eliminator box 52 provided with a group of baffle plates 52ª, as shown in Fig. 5. With the outlet pipe 47, near the fan, connects a purge-pipe 51, Fig. 4, which may lead to the external air. A gas delivery pipe 53, Fig. 5, leading from the eliminator 52, has a connected pressure governor 54, Fig. 5ª, and connects by branches with the cylinders of the internal combustion engine 55. Near the engine and before the governor the pipe 53 has a blow-off branch pipe 56 provided with a butterfly valve 57, or other suitable form of valve. Pipe 53 is provided, adjacent to the engine, with a butterfly valve 58 and the levers of these valves 57 and 58 are connected by a rod or cord 59, so that the closing of valve 58 will automatically open valve 57. By means of this mechanism the generation of gas need not be interrupted or checked when the engine is reversed or temporarily stopped by closing valve 58. The body of fuel in the generator 1 will, therefore, remain in full operative condition and a standard quality of gas be constantly delivered, so that by opening valve 58, standard gas will be supplied to the engine. When bituminous coal is used in the generator, the gas evolved from the distilling coal, would soon become too rich in hydrocarbons for uniformly operating the engine, if the supply of air to the generator and the outflow of gas from the generator were temporarily stopped when the engine was reversed or temporarily stopped, as often happens in navigating a boat, to avoid collision with other boats, or for other reasons. This provision is important for a marine vessel, where no holder is used, but if the power plant is used on land the pipe 56 may discharge into a storage holder. An exhaust pipe 60 leads from the engine to the inlet pipe 21 at the base of the tubular economizer 2. The pipe 60 connects with a coupler at economizer 2, with which also connects pipe 21 and the lower end of this coupler is open for admitting air. The exhaust fan 46 which draws gas off from the generator will also draw air and exhaust products into the heating chamber 17 of the economizer, wherein both are heated, and flow then through the three-way valve 26 and pipe 27 into the top of the generator 1, as indicated in Fig. 5.

In the diagrammatic view, Fig. 6, the construction and arrangement of the exhauster is modified and in place of a centrifugal extractor and fan, a water-jet exhauster 22$^a$, may be connected in the pipe connection between the economizer 2 and the spray scrubber 3, and in such device is placed a valve 22$^b$ for controlling the supply of water to the jet nozzle. In this modification, the eliminator 52 is placed near the top of the spray scrubber 3. The pipe connections, valves, pressure governor, and other connections between the eliminator and the gas engine are substantially the same as shown in Figs. 5 and 5$^a$.

A tank 62, Figs. 5 and 6, a gas compressor 63 and pipe 64 supplies compressed gas by pipe 35 to the ash-pit.

Figure 3:
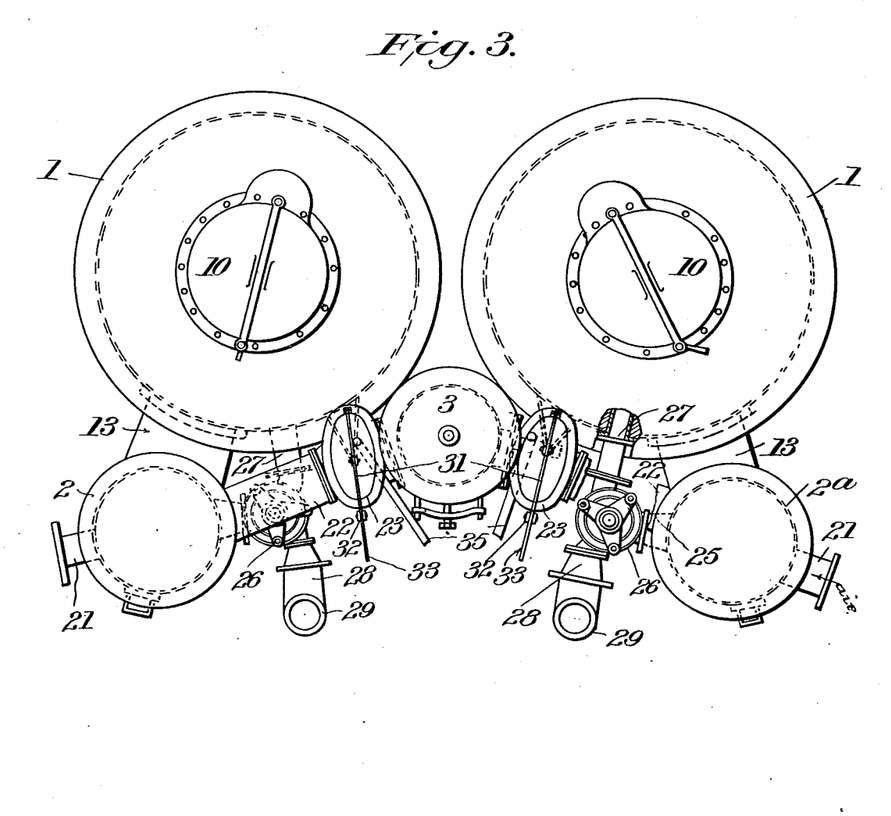
Fig. 3 represents a top plan view, with parts broken away, of the apparatus shown in Fig. 1.

The compact arrangement of the apparatus for generating, cleaning and delivering gas is shown properly assembled in Figs. 3 and 4, adapted to be placed on a vessel, and the gas engine will be placed in the most effective position for connection with the propeller shaft. Every part of the apparatus is constructed and arranged with special reference to taking up the least possible space and being of the lightest construction, consistent with efficiency. Instead of the vertical spray scrubber 3 a horizontal scrubber may be effectively used and placed on the upper deck of a vessel so that the waste water may be readily drained off into the sea without pumping. A centrifugal cleaner and exhaust fan, operated at high speed are preferred for the reason that they are very much lighter than a positive Root, or other, exhauster, also for the further reason that in case the exhaust fan is accidentally stopped gas may be sucked through it by the engine, in sufficient quantity to operate the same.

Though we preferably use bituminous coal, as being the most convenient and readily obtainable, at comparatively small cost, in most localities, we may use coke, anthracite coal, lignite, peat or wood for generating gas with satisfactory results in our down draft generator. A fire having been kindled on the grate, coil is gradually fed in and allowed to burn by natural draft until a suitable bed of incandescent fuel is produced and the products allowed to escape through the purge stack 29; then the generator is closed, valve 26 adjusted to close the opening to the stack and open communication from heating chamber 17 to the top of the generator and the extractor 45 and exhaust fan 46 put into operation by turning on current to the high-speed electric motor, 49. The fan will draw air through pipe 21 into heating chamber 17, thence through pipe 27 into the generator and down into the ignited fuel wherein motive power gas will be generated. This gas, passing by exhaustion down through the incandescent fuel, will be subjected to a sufficiently high temperature to convert all the contained oily and tarry vapors into fixed combustible gas, and most of the carbon dioxid into carbon-monoxid. The volume of gas thus produced will be drawn off from the base of the generator through the tubes of the economizer 2, thence through the spray scrubber 3 and thence by the fan 46 through the centrifugal extractor and discharged under pressure either directly to pipe 53, or into the eliminator 52. The gas in passing through the economizer will be cooled by the air flowing in contact with the tubes in chamber 17, and in passing through the scrubber 3 will be further cooled and freed from particles of soot, or lamp black, ashes, etc., and in the centrifugal extractor will be further purified by removal of dirt. In case the gas discharged by the fan contains an objectionable percentage of moisture it will be passed through the eliminator and caused to impinge, in small streams upon a great number of baffle plates by means of which the particles of water will be eliminated and caused to drip into outlet chambers.

The gas passing into pipe 53 will be under variable pressure, produced by the high speed fan, and in order to reduce it to a uniform and approximately atmospheric pressure it is passed through the governor 54 and delivered at the desired pressure to the engine 55. Should the fan be accidentally stopped sufficient gas may be sucked through it, by the engine, for a short time, as would not be possible with a positive rotary exhauster, such as a Root exhauster. We, therefore, preferably use a high-speed electric motor and fan for exhausting gas from the generator and drawing air and exhaust products from the engine into the generator. No steam is required in the production of gas. The carbon dioxid in the exhaust products, in passing through the incandescent fuel, is converted into combustible carbon monoxid, while oxygen of the air maintains combustion and is converted into carbon monoxid. A small percentage of hydrogen will be made or evolved from the coal or other fuel used. The gas produced contains the requisite percentage of thermal units to make a most effective motive power in an internal combustion engine of large power.

Fuel will be fed into the generator as required for maintaining deep beds of incandescent fuel in the best condition for most effectively producing a standard quality of gas.

After operating the generator for several hours the body of fuel may become plugged or clogged with ash, fine carbon and cinder so as to impede the passage of air down through the same as will be shown by a vacuum gage applied to the outlet pipe. This condition is apt to arise in a down-draft generator, and particularly, when bituminous coal is used, since the tarry matter distilled from the fresher coal flows down into contact with incandescent coal and is decomposed causing the resulting lamp-black or fine carbon to plug the interstices of the fuel. When this condition arises the three-way valve 26 will be adjusted to make connection from pipe 27 at the top of the generator to the purge pipe 29, at the same time the valve 36 in pipe 25 will be suddenly opened, admitting a jet of gas under pressure into the base of the body of fuel, thereby blowing ash, fine carbon and cinder from the interstices of the body of fuel and thence out through the purge stack 29. These sudden puffs may be repeated at short intervals until the fuel bed is suitably opened and cleaned and then the three-way valve will be adjusted to open communication from heating chamber 17 through pipe 27 to the generator. Gas may be compressed in cylinder 62 up to a pressure of 60 to 100 pounds by means of the compressor 63. At intervals of twenty-four hours or more, the ashes may be cleaned from the base of the generator and removed through the doors 7 and 8. When one generator is thus being cleaned the other generator may be in active operation for the production and delivery of gas.

During the propulsion of a vessel it may be necessary, at any moment, to reverse the engine or to temporarily stop the same and when this is required, gas will be shut off from the engine by closing valve 58 in the supply pipe 53. In this movement of closing valve 58 the valve 57 in blow-off pipe 56 will be opened, by reason of the rod 59 connecting the levers of the two valves, and gas which is delivered from the generator through pipe 53 will be temporarily blown off or into a holder without stopping the production of gas in the generator. The centrifugal extractor and fan being kept in operation will instantly deliver gas of standard quality to the engine on opening valve 58.

Having described our invention, what we claim as new and desire to secure by Letters Patent, is—

1. The method of operating a marine gas power plant, which consists in continuously generating producer gas continuously drawing or exhausting the gas from the producer and supplying it at a regulated and approximately atmospheric pressure to an internal combustion engine and, at the time of reversing the engine or running at reduced speed, blowing off the excess of gas, without interrupting the action of the exhaust, whereby gas of substantially uniform calorific value may be continuously generated irrespective of the action of the engine and suppplied on instant demand, at all times, to the engine when required for operating it at increased or full speed for propelling a vessel.

2. The method of operating a marine gas power plant, consisting in continuously generating producer gas of consistent calorific value and drawing or exhausting it off down through the body of fuel, cleaning such gas by sprays of water, continuously drawing off the cleaned gas, regulating and reducing the pressure and delivering the gas at approximately atmospheric pressure to a gas engine, and when the engine is temporarily stopped, or operated at reduced speed or load, blowing off gas without interrupting the action of the exhaust, whereby the generation thereof is maintained uniform irrespective of whether the engine is in operation or not and whereby a standard quality of gas may be delivered at all times on instant demand, so that full power may be had as required for propelling a vessel.

3. The method of operating a gas power plant, consisting in continuously generating producer gas and drawing it off from the body of fuel, cleaning such gas by sprays of water, continuously exhausting off the cleaned gas, regulating and reducing the pressure and delivering the gas at approximately constant pressure to a gas engine, heating the exhaust gaseous products from the engine, mixed with air by means of the outgoing hot gas, and drawing the resulting hot mixture into the fuel of the generator for effecting economy in operating the plant, and when the engine is temporarily stopped, or operated at reduced speed or load, blowing off gas without interrupting the action of the exhaust, whereby the generation thereof is maintained uniform irrespective of whether the engine is in operation or not and whereby a standard quality of gas may be delivered at all times on instant demand, so that full power may be had as required for propelling a vessel.

4. The method of operating a gas power plant, consisting in continuously generating producer gas and drawing or exhausting it off from the body of fuel, cleaning such gas by sprays of water, continuously exhausting off the clean gas, regulating and reducing the pressure and delivering the gas at approximately constant pressure to a gas engine, passing the exhaust gaseous products from the engine together with air into a heater and heating the mixture by means of outgoing hot gas from the generator, and drawing the hot mixture of products and air into the top of the generator and thence down into and through the body of fuel for effecting economy in operating the plant, and when the engine is temporarily stopped or operated at reduced speed or load, blowing off gas without interrupting the action of the exhaust, whereby the generation thereof is maintained uniform irrespective of whether the engine is in operation or not, and whereby a standard quality of gas may be delivered at all times on instant demand to the engine, so that full power may be had as required for propelling a vessel.

In testimony whereof we affix our signatures in presence of two witnesses.

HAWLEY PETTIBONE.
C. LEE STRAUB.

Witnesses:
T. F. MEAGHER,
W. R. FULLER.